US006210788B1

(12) United States Patent
Cuypers

(10) Patent No.: US 6,210,788 B1
(45) Date of Patent: *Apr. 3, 2001

(54) METHOD FOR PRODUCING A THERMOPLASTIC SYNTHETIC MATERIAL AND IMMOBILIZATION ELEMENT PROVIDED THEREWITH

(76) Inventor: Steven Cuypers, Swaenebeecklaan 39, Gravenwezel (BE), B-2970

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,184

(22) Filed: Jul. 2, 1997

(30) Foreign Application Priority Data

Oct. 7, 1994 (BE) .................................................. 9400911

(51) Int. Cl.[7] .............................. B29C 44/24; B32B 5/18
(52) U.S. Cl. ........................ 428/316.6; 156/78; 264/45.3; 264/45.9; 264/156; 264/DIG. 6
(58) Field of Search ................................. 264/45.3, 45.9, 264/DIG. 6, 156; 128/846; 156/78; 602/6; 428/308.4, 316.6

(56) References Cited

U.S. PATENT DOCUMENTS

| 3,615,972 | * | 10/1971 | Morehouse, Jr. | ....................... 156/79 |
| 3,618,599 | * | 11/1971 | Beightol | ................................... 602/2 |
| 3,900,543 | * | 8/1975 | Davis | ................................... 264/45.9 |
| 3,908,644 | * | 9/1975 | Neinart et al. | ............................ 602/8 |
| 4,108,806 | * | 8/1978 | Cohrs et al. | ............................ 521/54 |
| 4,243,754 | * | 1/1981 | Swan, Jr. | ................................ 521/55 |
| 4,250,136 | * | 2/1981 | Rex | ................................. 264/DIG. 6 |
| 4,683,877 | * | 8/1987 | Ersfeld et al. | .................... 428/308.4 |
| 5,132,061 | * | 7/1992 | Lindeman et al. | .............. 264/DIG. 6 |
| 5,244,613 | * | 9/1993 | Hurley et al. | ........................... 264/50 |
| 5,540,652 | * | 7/1996 | Callinan et al. | ......................... 602/1 |
| 5,593,628 | * | 1/1997 | Scholz et al. | ......................... 264/154 |
| 5,665,785 | * | 9/1997 | McClellan et al. | ................. 264/45.5 |

FOREIGN PATENT DOCUMENTS

| 0390147 | * | 10/1990 | (EP) . |
| 0393003 | * | 5/1993 | (EP) . |
| 0575012 | * | 12/1993 | (EP) . |
| 2244714 | * | 12/1991 | (GB) . |

OTHER PUBLICATIONS

Database WPI—Section Ch, Week 8604, Derwent Publications Ltd., Great Britain; Class A32, AN 86–023788 and JP–A–60 244 511 (Asahi Glass KK), Dec. 4, 1985.*

* cited by examiner

Primary Examiner—Allan R. Kuhns
(74) Attorney, Agent, or Firm—Baker Botts L.L.P.

(57) ABSTRACT

The present invention relates to a method for producing a thermoplastic material for immobilization and/or protection of a part of the body. The method includes the steps of (1) admixing a thermoplastic material with at least one foaming agent and (2) extruding the admixture at a temperature sufficient to expand the foaming agent and for a specified resident time interval.

15 Claims, No Drawings

US 6,210,788 B1

METHOD FOR PRODUCING A THERMOPLASTIC SYNTHETIC MATERIAL AND IMMOBILIZATION ELEMENT PROVIDED THEREWITH

FIELD OF THE INVENTION

The present invention relates to a method for producing a thermoplastic material for immobilization and/or protection of a part of the body, wherein a thermoplastic base material is chosen which is admixed with at least one filler.

BACKGROUND OF THE INVENTION

Various applications are possible in this context, in particular for immobilization purposes in medical and paramedical applications, for protective purposes in sport and for use in the production of shoes.

In the fields of application of orthopaedics, physical rehabilitation and sports medicine large amounts of plaster are still being used. Furthermore, in this context as in radiotherapy and radiology, a whole series of immobilization and fixation materials are employed such as thermoplastic plate materials and thermosetting bandaging materials.

PRIOR ART

In the light of the abovementioned applications, the existing materials have the drawback of having a relatively high density. This high density results in two significant troublesome problems with respect to the abovementioned applications: the materials have a relatively high weight which limits user comfort and which may even trouble the user, and the therapeutic use of the materials used is diminished.

This may even lead to a medical problem, owing to the user being forced to greater exertion as a result of the greater weight.

This high density makes it impossible, in radiotherapy applications, in particular those employing low-energy sources, to transmit radiation through such dense materials without this having an adverse effect on the skin of the patient. The materials in moulded form are placed on the skin of the patient and fixed to a baseplate in order to put the patient in an immobile and reproducible position. These materials do not sufficiently transmit the radiation of, in particular, low-energy sources, as a result of which the radiation builds up immediately below the plastic material and can thus damage the skin.

In radiology, the relatively high density of most existing materials or intermediate constitutes a problem in that they do not sufficiently transmit the types of radiation and thus produce interferences on the image which may diminish the visibility of details on the image or may even cause distortion.

Additionally, there is disclosed by EP-A-0575012 the addition in said method, as the filler, a specific percentage of microspheres, said percentage being such that a foamed thermoplastic material is obtained which exhibits a specific mechanical strength and flexibility, said microspheres forming a foaming agent, and wherein the obtained mixture of thermoplastic material as the base material and foaming agent is subjected to at least one further processing step, and wherein the mixing of said base material and said foaming agent is effected by subjecting said mixture to an extrusion step with a set temperature and a set residence time of the mixture in the extrusion means.

OBJECT OF THE INVENTION

It is an object of the invention to provide a solution to the abovementioned problems.

SUMMARY OF THE INVENTION

To this end, according to the invention, there is provided a method for producing a thermoplastic material for immobilization and/or protection of a part of the body wherein there is specifically provided that the microspheres contain a lightweight gas which, when exposed to a specific temperature, causes the microspheres to expand within the mixture, the latter being likewise subjected to an expansion process which makes it possible to effect a significant reduction in weight of the intermediate. Thanks to the invention, a foamed intermediate is obtained which is sufficiently strong and more user-friendly than existing intermediates, owing to which the invention primarily has a lower density and consequently a lower weight and better transmissivity for radiation sources which are used in radiotherapy and in radiodiagnostics and thus makes the invention further suitable for immobilization and/or protection of a part of the body, wherein it is possible to achieve a substantial reduction in density of the material. Thus, in the course of the plastic being processed into an intermediate, the density of the plastic is lowered by a corresponding percentage. Furthermore, the lighter an immobilization, fixation or protection material, the more pleasant it is for the user. It results from the foregoing that the present invention differs from the teachings of "Database WPI, Section Ch, Week 8604, Derwent Publications Ltd., London, GB; Class A 32, AN 86-023788" in that the mixing of the base material and the foaming agent is effected by subjecting said mixture to an extrusion step with a set temperature and a set residence time of the mixture in the extrusion means.

In particular, said foaming agent is added in accordance with a percentage which is within the range from 0.1% to 10%, it thus being possible to achieve a reduction in density of the material of between 1 and 60%. Thus, in the course of the plastic being processed into an intermediate, the density of the plastic is lowered by a percentage of between 1% and 60%. Furthermore, the lighter an immobilization, fixation or protection material, the more pleasant it is for the user.

According to a generally advantageous embodiment of the invention. During the extrusion step, the temperature is, in particular, set to such a value that an expansion process of the mixture is started under the influence thereof.

More in particular, said residence time of said mixture is set, during the extrusion step, within a time interval between a minimum value $t_{min}$, which is defined by a low time threshold, below which no expansion of said foaming agent takes place, and a maximum value $t_{max}$ which is defined by a high time threshold, beyond which combustion of said mixture may take place.

According to a preferred embodiment of the invention, the expansion process of said mixture is tailored to the extrusion step and takes place completely within the latter, the expansion process being stopped, at the latest, when the extrusion step is stopped. If not, the process continues during the processing of the intermediate, which leads to undesirable effects.

According to a further advantageous embodiment, said mixture is subjected to a multiple extrusion step, a multiple, in particular double, extrusion being carried out in the same step on said mixture. Thus better dispersion is obtained of the two components of the mixture, base material and foaming agent. Moreover, very accurate control of the processing temperature is thus accomplished.

This ensures, not least thanks to accurate control of the further extrusion parameters, in particular residence time, that the expansion process can be adequately controlled in order to arrive at a serviceable end product; owing to the foaming agent being well dispersed in the matrix base material. In particular, in this case the base material chosen is a low-temperature thermoplastic which exhibits a processing temperature which is less than 100° C., preferably between 40° C. and 90° C., more preferably between 50° C. and 80° C. Alternatively it is also possible, in this context, for the base material chosen to be a high-temperature thermoplastic which exhibits a processing temperature which is greater than 100° C., preferably between 120° C. and 180° C.

This is further assisted by the foaming agent being added in the form of a powder, in particular in a percentage within a range between 0.5 and 5%, preferably between 1 and 4%.

According to a yet further advantageous embodiment of the invention, said mixture is subjected to a two-dimensional extrusion, said foaming agent in particular being blended into resin granules or a so-called masterbatch, and said foaming agent is added in the form of the said resin granules. Thanks to this it was found that the foaming agent in the form of a masterbatch can be readily dispersed in the matrix base material. It was consequently possible to make the various base materials into a plate having a relatively smaller thickness, for example approximately 3 mm, while maintaining its advantageous properties according to the invention. Further, the microspheres have expanded uniformly in the polymer base material matrix, with a considerable reduction in density and likewise with a uniform distribution therein. In the process, foaming agent is added in a favoured manner at a percentage in the range between 2 and 6%, preferably between 3 and 5%, more preferably approximately 4%.

Hard foam materials based on thermosetting polyurethane do exist. This type of foam unit, in order to provide sufficient mechanical strength, be used in a relatively thick layer which makes it inappropriate for applications in radiotherapy and in radiology. Moreover, this type of foam must be prepared by the user him/herself at the time of application, on the basis of a 2-pack product which produces a chemical reaction. This process considerably reduces the user-friendliness of this type of foam. Moreover, it may also give rise to environmental problems.

In the case of hard foams based on poly(vinyl alcohol) the same problem of adequate mechanical strength arises, as a result of which it cannot be used, particularly in radiotherapy and radiological applications, as an immobilization or fixation material. Owing to the great layer thickness of the intermediates, these cannot be used on existing base fixation plates which are in circulation for these applications.

It is also possible, in accordance with alternative embodiments, for said mixture to be subjected to an injection-moulding process or to a pressure-moulding process, respectively.

In a supplementary manner it is further possible, after the completion of said at least one further processing step, in which an intermediate is obtained, for said intermediate to be subjected to a performation.

According to a more specific embodiment, there is applied, to at least one of the two sides of the intermediate produced by means of said at least one further processing step, at least one further layer of plastic material having closed cells, to protect the surface against various external influences such as humidity and UV rays. In particular in this context, said at least one further layer is applied by means of a coextrusion step and it is further possible for each said further layer to have a different composition and/or structure.

According to a particularly advantageous embodiment, one of said further layers is applied as the outer layer (of the intermediate) which in this case is not foamed. This, surprisingly, proves successful in safeguarding the stiffness of the intermediate for a specific wall thickness while at the same time reducing the total weight of the intermediate with respect to an intermediate which consists entirely of a non-foamed material.

The present invention also relates to a thermoplastic immobilization element for the immobilization of a part of the body, which is remarkable in that is comprises a layer consisting of an intermediate which has been produced by means of a method as expounded hereinabove. Nonlimiting examples of thermoplastic materials which can be contained in the base material are polycaprolacetone, polyurethane, poly(vinyl chloride), 1,4-trans-polyisoprene, ionomer, ethylene vinyl acetate, and a blend of polycaprolactone and thermoplastic polyurethane.

None of the prior art discloses a thermoplastic immobilization element for immobilization of a part of the body, characterised in that it comprises a layer made from an intermediate produced by means of the method of the present invention.

The only document which discloses a material for medical or paramedical use is EP-B-0393003 which discloses a composite material, particularly for orthopaedic use, which comprises a core of a thermoplastic composition containing polycaprolactone and polyester and having a thickness between 0.05 and 25 mm, and on both sides thereof a coating of a soft resilient open cell foam plastic with a thickness outside the core between 0.05 and 1.5 mm, wherein the core is comprised of three layers consisting in a middle layer of a thermoplastic composition containing polyurethane and polycaprolactone and two thinner outer layers containing a higher polycaprolactone content and having a lower weakening point than said middle layer.

The subject matter of the present application, differs from said document EP-B-0393003 in that the thermoplastic base material contains microspheres containing a lightweight gas which, when exposed to a specific temperature, causes the microspheres to expand within the mixture, the latter being likewise subjected to an expansion process. The problem faced in the present application is to provide a thermoplastic immobilization element for immobilization of a part of the body to be used in the fields of application of orthopaedics, physical rehabilitation and sports medicine as well as in radiotherapy and radiology, where a whole series of immobilization and fixation materials are employed such as thermoplastic plate materials and thermosetting bandaging materials.

There is no indication from the prior art of a thermoplastic material which contains microspheres containing lightweight gas subjected to an expansion process as immobilization element for immobilization of a part of the body.

The invention further also relates to the use of the abovementioned thermoplastic immobilization element as a protective layer of a part of the body, in particular a limb, which is subjected to repeated, frequent and/or accelerated movements, and of footwear, in particular a shoe having a heel and a tip, a thermoplastic immobilization element therein being provided as a stiffener thereof. The known materials which are presently used in the manufacture of shoes to stiffen the tips and the heels are relatively heavy, compared with the invention. Particularly in the case of sports shoes it is important that the weight remain as low as possible. The lower the weight of the component, the more efficient it is for the user. In light of these needs, the present invention further encompasses the hereinbefore described method wherein the appliance for implementing the method comprises (i) a twin-screw extrusion machine and/or (ii) an extruder having a flat female mold having a certain width for fabricating flat plates.

DESCRIPTION

A few tests are described here. All tests have so far been done on extrusion machines.

In the first instance, a test was carried out on a laboratory extruder for making narrow ribbons. A first test was carried out employing, as the base material, polypropylene having a melting point higher than 100° C. (Use in so-called high-temperature thermoplastics, primarily in the orthopaedics sector; less energy required for the activation of such materials than in the case of low-temperature thermoplastics, i.e. melting temperature below 100° C.). The added foaming agent had the form of a powder. A first subtest was carried out with the addition of almost 3% of foaming agent and a second subtest with the addition of almost 6% of foaming agent. These experiments produced the following observations:

- the combination of polypropylene and the foaming agent can be processed on conventional extrusion machines, and the result according to the invention can consequently be achieved by means of ordinary classical apparatus;
- the temperature at which the extrusion occurs is a very important parameter for this process, because it is the initiator of the expansion process;
- the residence time of the product in the extruder is likewise very important, since said residence time and also the temperature absorption affects the foaming agent. It was noted that if the residence time is too short, the foaming agent does not expand and if the residence time is too long, combustion of the material occurs; and
- the percentage addition of the foaming agent to the base material further also plays an important part.

Production according to the invention takes place by a specified percentage of microspheres being added to the base material. These microspheres include a lightweight gas which, under the influence of temperature, increases in volume. Owing to this increase in volume, the microspheres take up a larger percentage of the volume of the intermediate. Since the expanded microspheres have a lower weight than the base material to which they were added, the weight of the intermediate is reduced as a result, the volume of the intermediate remaining the same.

For sports applications, the weight of the materials used is of primordial importance. Particularly in those applications, where provision of therapeutic immobilization or protection matters, the invention has a considerable advantage with respect to existing materials, in view of its low weight.

Whilst already foamed materials employed for this purpose do exist, such as softer foams based on polyolefins and polyurethane, these foams are too soft to be capable of an immobilization or fixation function and are therefore used exclusively as a comfort-creating element. They are therefore not eligible for the intended applications where immobilization or fixation is required, in contrast to the invention.

After the extrusion tests, the intermediates obtained were tested by heating them in an oven and forming them in accordance with the conventional techniques which are used in the respective fields of application. This showed that it is necessary for the expansion process to take place in its entirety during the extrusion. If this does not happen, the process continues during processing of the intermediate, which leads to undesirable effects.

The extruded samples were studied under an electron microscope, which showed that the foaming agent in powdered form had indeed expanded but that it had nevertheless not dispersed entirely satisfactorily in the matrix base material.

Therefore, advantageously, in the second instance tests were carried out on a laboratory twin-screw extrusion machine. By means of such a machine, better dispersion is obtained of the two components of the mixture of base material and foaming agent. Moreover, this machine provides very accurate control of the processing temperature. In this test, the base material used comprised two thermoplastics which have a processing temperature below 100° C., in particular polycaprolactone and a blend of polycaprolactone and thermoplastic polyurethane. In each case, 1% and 3% foaming agent was added in the form of a powder. The result of the test was that, given accurate control of the extrusion parameters, in particular temperature and residence time, the expansion process can be adequately controlled in order to arrive at a servicable end product, provided that the foaming agent is sufficiently dispersed in the matrix base material.

A third test was carried out, this time on a production machine, viz. an extruder having a flat female mould of a width of approximately 120 cm for the production of flat plates. Again, various base materials were used as the matrix, viz. low-density polyethylene, polycaprolactone, and a blend of polycaprolactone and thermoplastic polyurethane.

In this test, the foaming agent was added in the form of so-called masterbatch, viz. resin granules which had already been blended with the foaming agent. In each case, approximately 4% of masterbatch were added.

These tests showed that the foaming agent in the form of a masterbatch is readily dispersible in the matrix base material. Consequently it was possible to make the various base materials into a plate having a thickness of approximately 3 mm. After the extrusion tests, the plate materials were studied under an electron microscope, which showed that the microspheres had expanded evenly in the polymer matrix.

Moreover it was observed, when the test plates were weighed, that the density had decreased by from 27 to 33%.

Advantageously, the plastic material according to the invention is also used in sports, where, in particular, materials to protect human limbs and for protecting the legs of horses in equestrianism are required. In the shoe industry likewise the plastic materials according to the invention are used for making stiffeners in a shoe.

The uses of the above-described invention are numerous, in particular for the use of a foamed thermoplastic material as an immobilization or fixation material of a part of the human or animal body in medical applications; for the use of a foamed thermoplastic material in orthopaedics and/or physical rehabilitation, said material serving for the purpose of supporting, replacing or fixating a part of the human body; and for the use of a foamed thermoplastic material in radio-therapy and radiology, where a part of the body is immobilized and positioned during the therapeutic treatment or the diagnostic investigation. European Patent No. 0401883 of the same Applicant, this being incorporated by reference.

What is claimed is:

1. A process for making a thermoplastic intermediate material for immobilization and/or protection of a body part, comprising:

admixing a thermoplastic material with 0.1% to 10%, by weight, of a foaming agent comprising microspheres which contain a lightweight gas;

extruding said admixture through an extruder to obtain a foamed intermediate, wherein said extruding step is conducted at a temperature at which the foaming agent expands, and wherein said admixture is maintained in the extruder for a resident time interval between a minimum value $t_{min}$, below which the foaming agent does not expand, and a maximum value $t_{max}$, beyond which there is a possibility of combustion; and applying to said foamed intermediate a layer of plastic material having closed cells.

2. The process according to claim 1, wherein the temperature of said extruding step is in a range between 100° C. and 200° C.

3. The process according to claim 1, wherein foaming expansion takes place during extruding only.

4. The process according to claim 1, wherein said extruding step is repeated one or more times.

5. The process according to claim 1, wherein the thermoplastic material is a low-temperature thermoplastic material having a processing/melting temperature which is less than 100° C.

6. The process according to claim 1, wherein the thermoplastic material is a high-temperature thermoplastic material having a processing/melting temperature which is greater than 100° C.

7. The process according to claim 1, wherein the foaming agent is admixed as a powder.

8. The process according to claim 1, wherein the foaming agent is admixed as resin granules.

9. The process according to claim 1, wherein extruding comprises two-dimensional extruding.

10. The process according to claim 1 further comprising the additional step of pressure molding said foamed intermediate.

11. The process according to claim 1 further comprising the additional step of perforating said foamed intermediate.

12. The process according to claim 1, wherein said application step comprises coextruding the foamed intermediate with a plastic material having closed cells.

13. The process according to claim 1, wherein said application step comprises applying to said foamed intermediate a plurality of layers of plastic materials which differ as to composition and/or structure.

14. The process according to claim 13, wherein one of the plurality of layers is applied as an outer layer which is not foamed.

15. A thermoplastic immobilization element for immobilizing a body part, comprising a layer of a foamed intermediate made according to the process of claim 1.

* * * * *

UNITED STATES PATENT AND TRADEMARK OFFICE
CERTIFICATE OF CORRECTION

PATENT NO.    : 6,210,788 B1
DATED         : April 3, 2001
INVENTOR(S)   : Cuypers It is certified that error appears in the above-identified patent and that said Letters Patent is hereby corrected as shown below:

Title page,
Item "[22] Filed: Jul. 2, 1997" should read
-- [22]  PCT Filed:      Oct. 9, 1995
   [86]  PCT No.:        PCT/BE95/00092
         §371 Date:      Jul. 2, 1997
         §102(e) Date:   Jul. 2, 1997
   [87]  PCT Pub. No.:   WO 96/11226
         PCT Pub. Date:  18 Apr. 1996 --

Signed and Sealed this

Thirtieth Day of April, 2002

Attest:

JAMES E. ROGAN
*Attesting Officer*    *Director of the United States Patent and Trademark Office*